2 Sheets--Sheet 1.

J. A. SMITH.
Reed-Organ Stop-Actions.

No. 137,102.　　　　　　　　　Patented March 25, 1873.

Witnesses.　　　　　　　　　Inventor.

J. A. SMITH.
Reed-Organ Stop-Actions.
No. 137,102. Patented March 25, 1873.
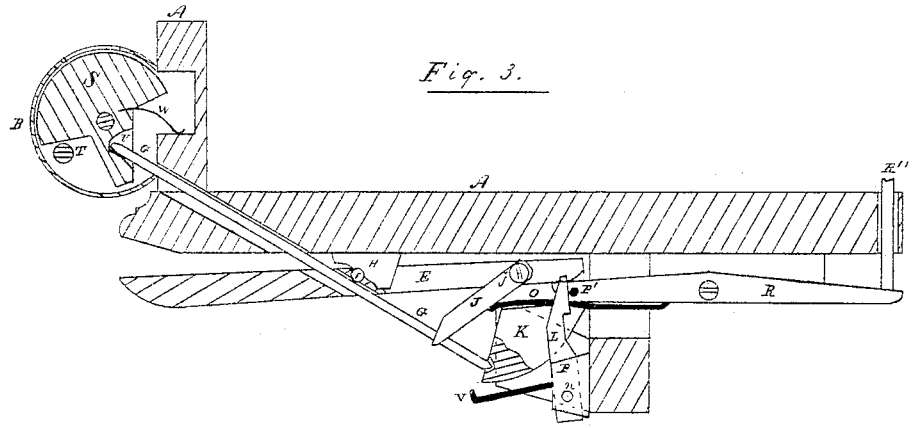
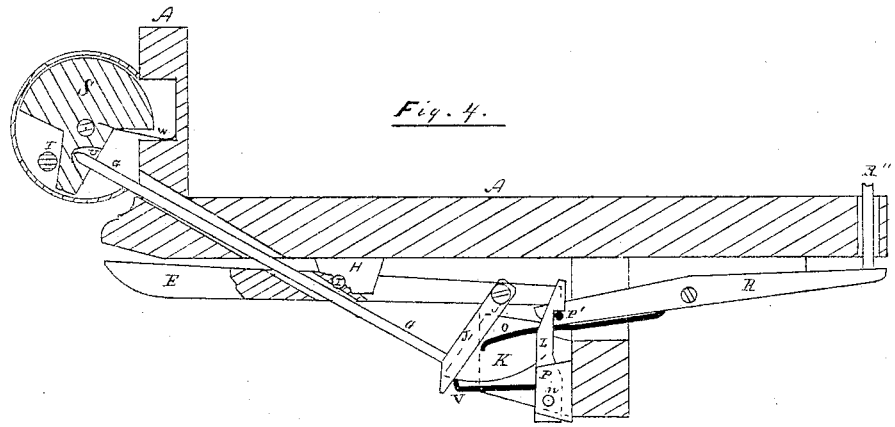
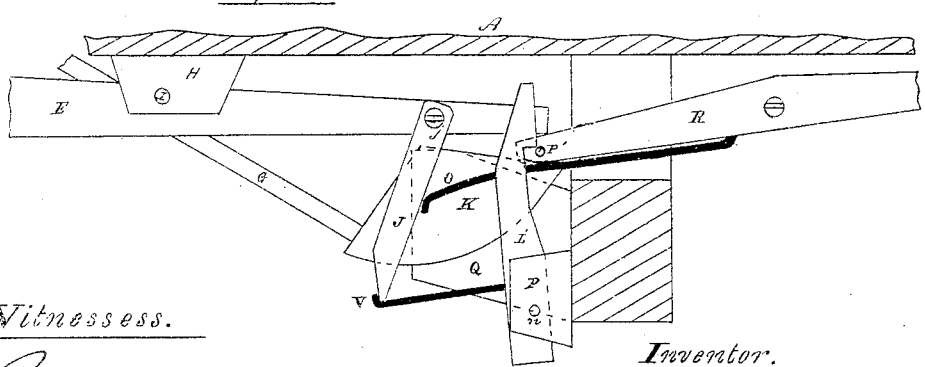
Witnesses. Inventor.

UNITED STATES PATENT OFFICE.

JOHN A. SMITH, OF ERIE, ASSIGNOR TO NEW ERA ORGAN COMPANY, OF NORTH EAST, PENNSYLVANIA.

IMPROVEMENT IN REED-ORGAN-STOP ACTIONS.

Specification forming part of Letters Patent No. 137,102, dated March 25, 1873.

*To all whom it may concern:*

Be it known that I, JOHN A. SMITH, of Erie, in the county of Erie and State of Pennsylvania, have invented a new Improvement in the Manner of Operating the Stops of Organs; and I do hereby declare the following to be a full, clear, and exact description of the same, reference being had to the accompanying drawing and to the letters of reference marked thereon, the same forming a part of this specification.

The nature of my invention consists, first, in operating the stops of organs by means of a lifting or upward motion of the knee of the operator, and by the word "operating" is meant both opening and closing the said stops, for the essential feature of the first part of my invention is that by it the operator can fully operate the various stops of the organ by one and the same motion of the leg, and that may be an upward, downward, or a sideward movement, but always the same movement for either opening or closing the stop, and that movement always being exercised upon the same lever; second, in providing a stop-register with oscillating tablets, the said register being so placed as to be immediately conspicuous to the operator, and said tablets being so lettered as to at once indicate the position of the accompanying stop to the operator.

Figure 1:
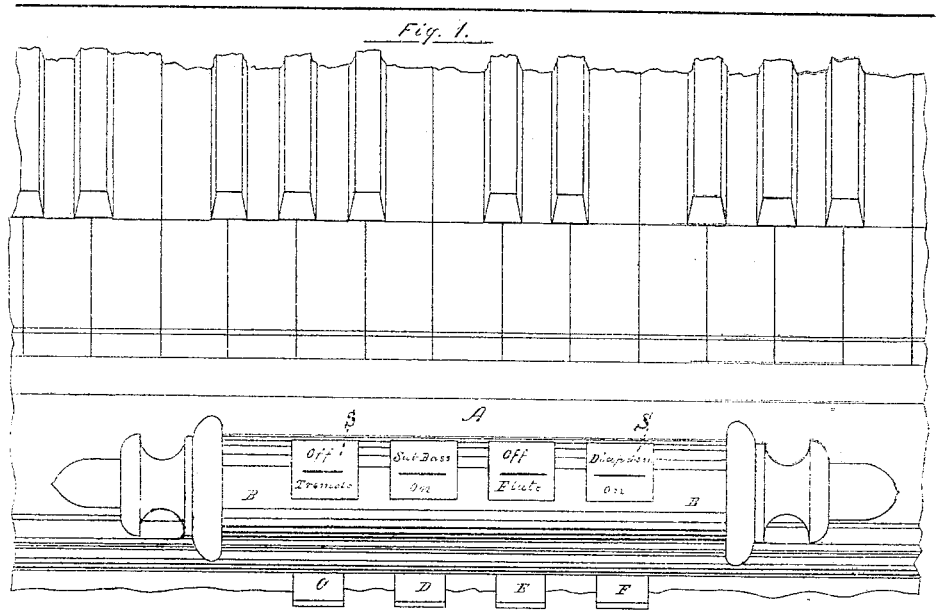
Figure 2:
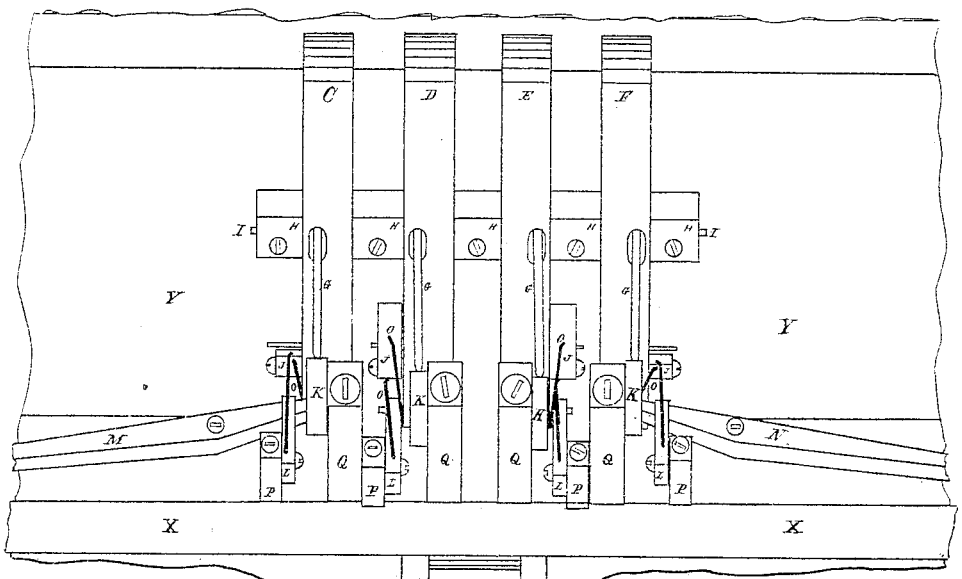

The accompanying drawing illustrates my invention as follows, the said drawing being on two sheets, Nos. 1 and 2:

Figure 1 is a perspective view of a section of the key-board and front part of an organ, as seen by the operator when in position for operating the same, the said view showing my stop-register in position, and also showing the ends of the levers which operate the various stops. Fig. 2 is a plan view of the under side of the foundation-board Y of a cabinet-organ with my improvement attached thereto. Figs. 3, 4, and 5 are transverse vertical sectional views of the parts of an organ, shown in Figs. 1 and 2, and of my invention as attached to the same.

General Description.

The various tones of an organ are regulated or produced by various stops, (so called,) which operate certain valves or mutes, and cause, by their action, the various tones or shades of tones. These stops are called diapason, flute, sub-bass, tremolo, vox humana, &c. During the performance of a piece of music these stops have to be brought into use singly and in every conceivable combination. These stops are usually operated by the hand of the operator, and in large organs by both the feet and hands of the operator. To operate the stops by the hand necessitates the removing of the same from its work on the key-board, the objections to which are obvious, and to overcome which my invention is designed.

In the accompanying drawing only four stops are shown, viz: the diapason, the flute, the sub-bass, and the tremolo, this number being considered sufficient to fully illustrate my invention. By my invention these stops are operated by levers F E D C, respectively. These levers are so placed as to be operated by the knee of the operator by a lifting or upward motion of the same. Thus, when it is desired to put on the flute-stop, the operator lifts the lever E with his knee, and afterward when he desires to take off the flute-stop, he again lifts the lever E, the motion in each case being exactly the same, the result also being indicated in the stop-register by the oscillating tablet, showing the words "on flute" or "off flute," as the case may be. The arrangements to produce these results will be seen in Figs. 3, 4, and 5, Sheet No. 2.

The stop here illustrated is "flute," and the operating-lever is E, this stop and lever being taken as an example, all being operated in the same manner. Here is seen the operating-lever E, hung by the center-pin I on the hanger-block H. Actuating this lever actuates the accompanying lever R, which raises the valve-pin R''.

Thus far the arrangement described is simple and common, but to sustain the valve-pin R'' the pressure must be maintained on the lever E.

To enable the operator to remove the pressure from the lever E, and yet keep the valve-pin R'' up, I have on the lever R a pin, P', over which catches the pawl L, which is hung on the hanger-block P by the center-pin $n$, thus holding down the lever R. (See Fig. 4.)

In Fig. 3, which shows the arrangement of the various parts when the flute-stop is off, the arrangement of levers and pawls must be closely noticed. Here on the lever E is hung a pawl, J, and it is held up by a wire, O, which is attached to the lever R. The pawl L has a wire hook, V, extending from it.

Fig. 4 exhibits the position of the various parts when the flute-stop is on. Here the lever R is down; the wire O, which, in Fig. 3, held up the pawl J, being also down, allows the pawl J to drop against the hook V; as the operator removes his knee from the lever E it drops back to its original position, and the pawl J enters the hook V. (See Fig. 5.) To let off the flute-stop he again raises the lever E, which presses down on the pawl J, by the hook V pulling forward the pawl L and releasing it from the pin P', which allows the valve-pin R'' to drop. This throws all the parts back to the position shown in Fig. 3. Thus the same motion of the operator's knee, on the same lever, both opens and closes the stop-flute, and the same of any other stop. This same arrangement of levers may be operated by a pedal movement as well as by various other movements, but I prefer the movement shown.

The operation and construction of the stop-register are as follows, (see Fig. 5:) K is a segmental tumbler, and is hung on the hanger-block Q. One end of this block rests against the under side of the lever R, and as that lever is moved the tumbler K receives its motion.

Within the stop-register cylinder, as seen in Fig. 1, are as many segmental tumblers as there are stops. These are all hung on a common center-pin. Each one of these has a spring, W, and when at rest, or when the stops are off, they rest in the position shown in Fig. 3, where another segmental tumbler is shown by S, and the cylinder by B. T is a stop. These tumblers S are connected with the tumblers K by the rod G; hence when the tumbler K is operated, so also is the tumbler S. Fig. 3 shows all these parts as seen when the stop is off; and Fig. 4 shows them as seen when the stop is on. Each of the tumblers S is provided with a tablet, which is exhibited through an opening in the cylinder B, as seen in Fig. 1. These tablets are provided with the word "off" at their upper end, and the word "on" at their lower end, and the name of the particular stop they represent in larger letters between the words "off" and "on." So when the tumbler S is in the position shown in Fig. 3, supposing it to be the "flute-stop," the tablet will exhibit the words "off flute," as seen in Fig. 1; and when the stop is thrown on the tumbler assumes the position shown in Fig. 4, and then the words "flute on" is exposed, as is the case with "diapason" in Fig 1. So, by this device the operator can see at a glance the condition of any of the stops, and he may change them as desired by a simple motion of the knee. Now, as the same movement of the knee on the levers F, E, D, or C will both put the stop on or off, as may be desired, any combination of stops may be produced by a single movement of the operator's knees upon two or more of the levers. The operator could at once place the stops in the positions shown in Fig. 1; and if it is desired to change from diapason to flute, and leave sub-bass and tremolo as seen in Fig. 1, it can be done by the operator pressing his right knee against both the levers E and F at the same time, for the pressure on F will throw diapason off, and the pressure on the lever E will put flute on. Thus two or more of the stops of an organ can be operated, as desired, and various combinations and changes be effected by a single movement of the knee or knees of the operator; therefore,

What I claim as new, and desire to secure by Letters Patent, is as follows:

1. The actuating-levers F E D C, being the levers in immediate connection with the operator, connected with the levers R, being the levers in immediate connection with the several stops, by means of such levers, pawls, hooks, and connecting-rods as shall cause like movements of the said levers F E D C to produce opposite results upon the levers R, substantially as and for the purposes shown and described.

2. The actuating-levers F E D C, severally connected with the proper levers, pawls, hooks, &c., operating substantially as described, that various alterations of the positions of the various stops may be accomplished by one movement of the knee or other member upon two or more of the said levers, as shown and described.

3. The lever E and accompanying pawl J, in combination with the lever R and wire O, as shown and described, for the purposes mentioned.

4. The lever E and accompanying pawl J, in combination with the hook V, pawl L, and lever R, as and for the purposes mentioned.

5. The pawl L and hook V, operated as described, for the purposes set forth.

6. The tumbler K, constructed as described, and in combination with the lever R, connecting-rod G, and tumbler S, as shown and described.

7. The tumblers S, constructed and operated to display the tablets indicating the positions of the stops.

8. The tumblers S, in combination with the cylinder B, as shown and described.

9. The stop-register indicating the positions of the various stops of the organ by means of oscillating tablets, as shown and described.

JOHN A. SMITH.

Witnesses:
JNO. K. HALLOCK,
L. H. COAX.